United States Patent [19]

Kawate

[11] Patent Number: 5,241,850
[45] Date of Patent: Sep. 7, 1993

[54] SENSOR WITH PROGRAMMABLE TEMPERATURE COMPENSATION

[75] Inventor: Keith W. Kawate, Attleboro Falls, Mass.

[73] Assignee: Texas Instruments Incorporated, Dallas, Tex.

[21] Appl. No.: 786,852

[22] Filed: Nov. 1, 1991

[51] Int. Cl.⁵ .............................................. G01P 21/02
[52] U.S. Cl. .................................................... 73/1 D
[58] Field of Search ............... 73/1 B, 1 D, 2, 766, 73/862, 623, 708, 517 R

[56] References Cited

U.S. PATENT DOCUMENTS

| | | | |
|---|---|---|---|
| 3,333,462 | 8/1967 | Toshio Doi | 73/766 |
| 4,202,218 | 5/1980 | Romo | 73/708 |
| 4,457,179 | 7/1984 | Antonazzi et al. | 73/701 |
| 4,765,188 | 8/1988 | Krechmery et al. | 73/708 |
| 4,982,351 | 1/1991 | Kawate et al. | 364/574 |
| 4,986,131 | 1/1991 | Sugiyama et al. | 73/766 |
| 5,024,101 | 6/1991 | Tanaka et al. | 73/766 |
| 5,042,307 | 8/1991 | Kato | 73/766 |
| 5,053,692 | 10/1991 | Craddock | 73/766 |
| 5,060,504 | 10/1991 | White et al. | 73/1 D |
| 5,103,667 | 4/1992 | Allen et al. | 73/1 D |
| 5,135,002 | 8/1992 | Kirchner et al. | 73/766 |

FOREIGN PATENT DOCUMENTS 0113904 9/1980 Japan ...................................... 73/766

OTHER PUBLICATIONS

Micromachined Silicon Accelerometers with Self-Testing Capabilities IC Sensors, Milpitas, Calif.

Primary Examiner—Robert Raevis
Attorney, Agent, or Firm—Russell E. Baumann; Richard L. Donaldson; René E. Grossman

[57] ABSTRACT

A sensor provides an electrical signal in response to occurrence of a condition and is programmed in accordance with tested temperature characteristics of the sensor to provide selected gain and/or offset in the output signal and to compensate for change in gain and/or offset of the output signal due to change in device temperature.

9 Claims, 1 Drawing Sheet

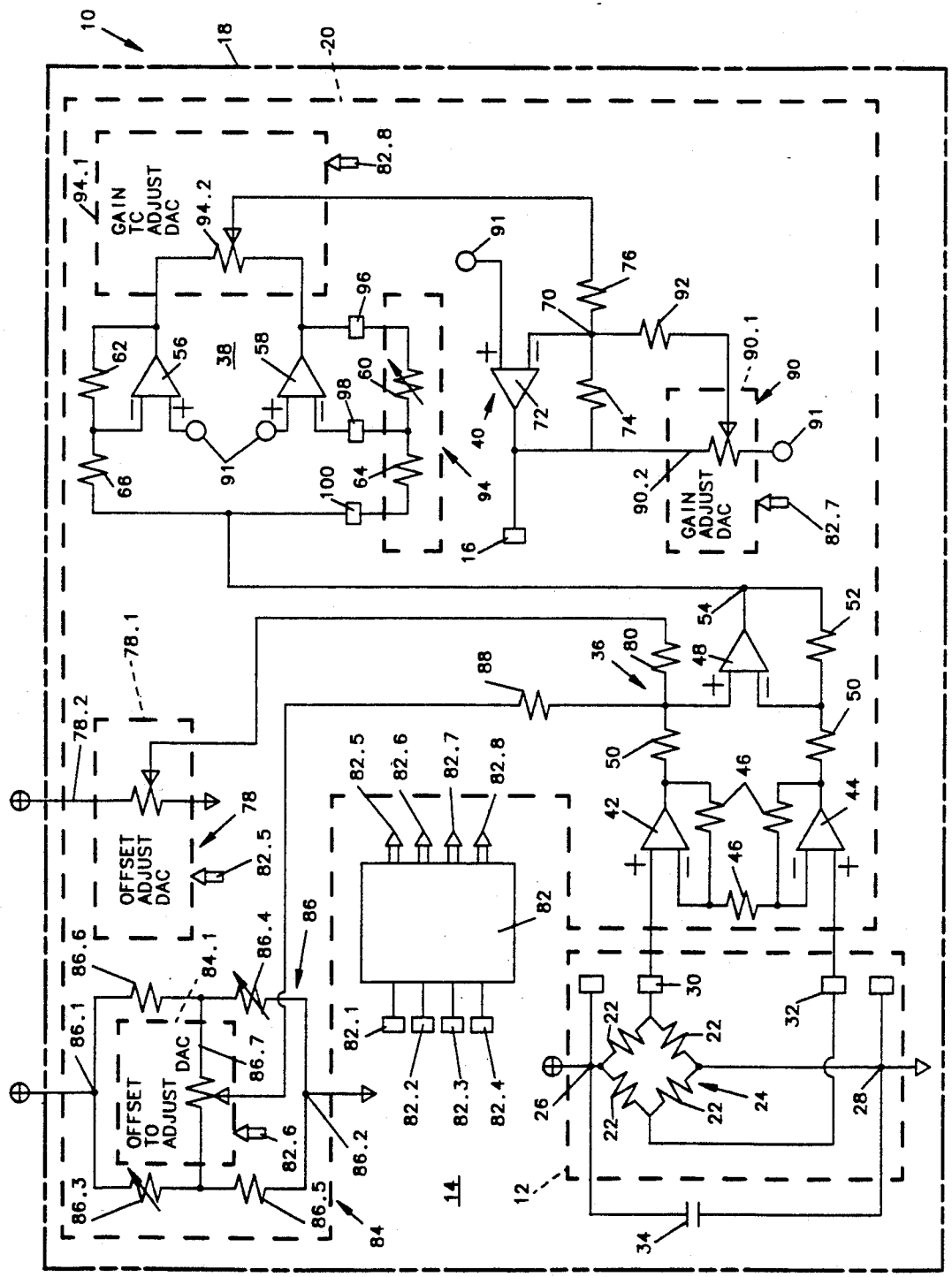

SENSOR WITH PROGRAMMABLE TEMPERATURE COMPENSATION

BACKGROUND OF THE INVENTION

The field of the invention is that of the sensors which provide an electrical output signal corresponding to a sensed condition, and the invention relates more particularly to novel and improved sensors which are programmable in accordance with tested temperature characteristics of the sensors to compensate for change in the output signal due to a change in temperature of the sensors.

Acceleration sensors formed by silicon micromachining techniques conventionally employ a proof-mass portion of a silicon body which is resiliently supported on a frame portion of the body by integral silicon beams. Piezoresistive elements are formed in the silicon material of some of the beams and display change in resistance when the beams experience strain as the proof-mass moves relative to the frame when subjected to an acceleration force. The piezoresistive elements are connected in a bridge circuit to provide an electrical output signal corresponding to the changes in resistance due to the acceleration force. Such acceleration sensors have attractive properties relative to size and cost and also have other desirable performance characteristics. However, the piezoresistive elements which contribute substantially to achieve the cost and performance advantages of the sensors are quite temperature sensitive so that there is substantial change in offset and gain in the output signal with change in sensor temperature.

BRIEF SUMMARY OF THE INVENTION

It is an object of the invention to provide a novel and improved condition-responsive sensor having temperature compensation; to provide such a condition-responsive sensor device having a bridge circuit arranged to provide an electrical output signal corresponding to a sensed condition and having novel and advantageous means for adjusting gain and/or offset in the output signal to compensate for change in the gain or offset due to change in temperature of the sensor; to provide such a condition-responsive sensor device which is programmable in accordance with tested temperature characteristics of the sensor to achieve such temperature compensation with precision and low cost in high volume for automated manufacture; and to provide such sensors which are of rugged and economical construction.

Briefly described, the novel and improved condition-responsive sensor of the invention comprises condition-responsive means having a bridge circuit or the like adapted to provide an electrical output signal in response to occurrence of a selected condition. Means are arranged to calibrate the output signal relative to the sensed condition and the calibrating means include means which are electrically actuatable to adjust the output signal to compensate for change in gain and/or offset therein due to change in the temperature of the sensor. Preferably, the calibrating means are programmed in accordance with tested temperature characteristics of the sensor to precisely provide such temperature compensation. In that way, the sensors achieve reliable and precise temperature compensation while being adapted for low cost, reliable manufacture.

In a preferred embodiment of the sensor, a plurality of piezoresistive elements are arranged in a bridge circuit in an accelerometer, for example, to provide an initial electrical signal in response to application of acceleration force. An integrated circuit signal-processing means responds to the initial electrical signal to provide the output signal, and means to calibrate the output signal relative to the force. Preferably the calibrating means have means responsive to the initial electrical signal and to temperature-sensing means to provide a temperature-modified intermediate signal which regulates the output signal. Preferably, for example, the temperature-responsive means comprise two parallel circuit paths which each receive input from the initial electrical signal. A temperature-sensing means is disposed in one of the circuit paths. Digital-to-analog converter means (DAC), preferably incorporated in the integrated circuit, are electrically actuatable to regulate signal transmission in the two circuit paths relative to each other to provide the temperature-modified intermediate signal for adjusting the output signal. A programmable means such as an electrically erasable programmable memory unit, EEPROM, is preferably arranged to receive data in accordance with tested characteristics of the sensor to regulate the digital-to-analog converter means and provide a temperature-modified intermediate signal which precisely adjusts gain and/or offset in the output signal to compensate for changes in sensor temperature.

In that way, the novel and improved sensor of the invention achieves the cost and performance characteristics of previously known bridge circuit sensor devices and the like while also achieving desired temperature-compensation properties in an economical and reliable way.

DESCRIPTION OF THE DRAWINGS

Other objects, advantages and details of the novel and improved sensor of the invention appear in the following detailed description of preferred embodiments of the invention, the detailed description referring to the drawing which comprises a schematic or functional diagram illustrating a preferred embodiment of the sensor of the invention.

DESCRIPTION OF THE PREFERRED EMBODIMENTS

Referring to the drawing, 10 in the drawing figure indicates the novel and improved sensor device of the invention which is shown to include a condition-responsive means 12 such as an accelerometer, a pressure sensor or a position sensor or the like. The sensor is adapted to be exposed to a condition in a zone 14 to be monitored to provide an electrical output signal at terminal 16 corresponding in some way to the status of the condition. The sensor preferably includes circuit means for receiving an initial electrical signal from the condition-responsive means and for processing the initial signal to provide desired signal amplification or the like. The sensor also includes means for calibrating the output signal relative to the condition being monitored. In a preferred embodiment, the condition-responsive means 12 is mounted on a support such as a printed circuit board 18 and the signal processing circuit is embodied in an integrated circuit unit 20 which is also mounted on the support.

In a preferred embodiment of the invention, the condition-responsive means 12 comprises a silicon micromachined accelerometer device as shown in commonly-assigned, copending application for U.S. patent application Ser. No. 07/718,523 filed Jun. 21, 1991, the disclosure of which is incorporated herein by this reference. In that accelerometer, a proof-mass portion of a silicon body is resiliently supported on a frame portion of the silicon body by integral silicon beams, and piezoresistive elements 22 are formed by diffusions into the silicon materials of some of the beams. The piezoresistive elements in the different beams are connected together in a conventional bridge circuit as indicated at 24. One junction of the bridge is connected to a power source through an appropriate accelerometer pad as indicated at 26 while an opposite bridge junction is connected to ground as at 28. The other bridge junctions are connected to respective accelerometer terminal pads 30, 32 and a capacitor 34 is connected across the bridge in conventional manner. The bridge is normally balanced as will be understood but the piezoresistive elements change in resistance as the accelerometer proof-mass moves in response to an acceleration force condition to provide a potential difference or initial electrical signal across the terminal pads 30, 32 corresponding to any imbalance in the bridge circuit resulting from the applied acceleration force condition. Although the condition-responsive means 12 uses a full resistive bridge circuit for providing the initial electrical signal, condition-responsive means full or half bridge circuits and with inductive or capacitive bridge impedance elements or the like as well as other condition-responsive means of various type are also within the scope of the inventions.

In a preferred embodiment, the signal processing circuit 20 preferably has three amplification stages 36, 38 and 40, the first comprising a differential amplifier stage as shown in the drawing. In the first stage 36, the positive terminals of a pair of operational amplifiers 42, 44 are connected to respective accelerometer terminal pads 30, 32 while gain-regulating resistors 46 are arranged in conventional manner as shown to provide desired preamplification of the initial electrical signal at the pads, thereby to reduce errors such as might otherwise result from accumulation of operational amplifier offsets in the circuit 20. The outputs of amplifier 42, 44 are furnished to respective inputs of an additional operational amplifier 48 via coupling resistors 50 and gain-control in the additional amplifier is provided by resistor 52, thereby to provide a first intermediate electrical signal at point 54 in the circuit 20. The second amplification stage 38 preferably comprises two additional operational amplifiers 56, 58 arranged with corresponding gain control resistors 60, 62 to provide a pair of parallel circuit paths for receiving the first intermediate electrical signal via respective-coupling resistors 64, 66, thereby to provide a second intermediate electrical signal at point 70 in the circuit 20. The third amplification stage 40 preferably comprises another operational amplifier 72 arranged with an appropriate gain-control resistor 74 to receive the second intermediate signal via the coupling resistor 76, thereby to provide the output signal at terminal 16.

The sensor further includes means for calibrating the sensor to provide a selected offset in the output signal. In a preferred embodiment, for example, offset calibrating means 78 comprise variable resistance means such as a potentiometer diagrammatically indicated at 78.2 in FIG. 1. The potentiometer is connected between a power source and ground and an adjustable contact thereof is connected to the positive terminal of the operational amplifier 48 via a coupling resistor 80, thereby to provide a selected bias or offset in the output signal.

The offset calibration means 78 is of any conventional type. Preferably, however, the offset calibrating means comprises an electrically actuatable and preferably programmable, calibrating means as shown in U.S. Pat. No. 4,982,351, the disclosure of which is incorporated herein by this reference. In one preferred embodiment, the offset calibrating means comprises digital-to-analog converter (DAC) means 78.1 such as a digital-to-analog converter arranged to cooperate with shift register means and memory means and the like as shown in the noted patent as diagrammatically indicted in the figure. In that regard, a memory unit 82 such as an electrically erasable EEPROM of any conventional type is mounted on the sensor support 18; is arranged to receive offset calibrating data from a sensor testing apparatus (not shown) as indicated at the power, reset, data and clock pins 82.1–0.4 of the unit; and is adapted to furnish that data to any conventional offset adjusting means such as is diagramnatically illustrated by the potentiometer 78.2 in the figure via a memory output terminal 82.5, thereby to adjust the first intermediate electrical signal provided at point 54 in the circuit to furnish a selected amount of offset in the output signal. As such offset calibrating means are described in the noted patent, they are not further described herein and will be understood that any conventional means for providing the output signal with selected offset is within the scope of the invention.

In accordance with the invention, the sensor calibrating means further comprises electrically actuatable means 84 for adjusting the sensor output signal to compensate for changes in offset which are due to change in temperature of the sensor. Preferably these temperature-compensating calibrating means are programmed after temperature characteristics of the individual sensors have been determined on test apparatus (not shown), thereby to permit precise temperature-compensation in offset in the output signal.

In a preferred embodiment, the temperature-compensating (TC) offset calibrating means 84 comprises a second bridge circuit 86 having opposite bridge junctions 86.1, 86.2 connected to a power source and ground respectively, having two opposite bridge elements formed by temperature-sensing means such as thermistors 86.3, 86.4, having two other bridge elements 86.5, 86.6 formed by temperature-independent resistors and having two other bridge junctions connected through a potentiometer 86.7. An adjustable contact of the potentiometer is connected to the positive terminal of the operational amplifier 48 via a coupling resistor 88. The bridge elements are selected to change the bridge balance with sensor temperature change to temperature-modify the first intermediate electrical signal furnished at point 54 in the sensor circuit as above-described. A digital-to-analog converter means diagrammatically indicated at 84.1 corresponds to the DAC means 78.1 previously described and is arranged to selectively adjust the potentiometer 86.7 in response to the data received from the memory unit 82 via unit output terminal 82.6. The memory unit is arranged to receive data relating to the temperature characteristics of the output signal of the sensor from a sensor testing apparatus (not shown) to adjust the first, temperature-modified intermediate signal to adjust the sensor output signal to compensate for changes in offset in the output signal which result from changes in sensor temperature.

The sensor 10 further includes means for calibrating the sensor to provide a selected gain in the sensor output signal. In a preferred embodiment, a gain calibrating means 90 comprises variable resistance means such as a potentiometer diagrammatically indicated at 90.2 in the drawing. The potentiometer is connected between sensor output and a bias voltage between power source and ground as at 91 and an adjustable contact thereof is connected to the negative terminal of operational amplifier 72 via coupling resistor 92, thereby to provide a selected gain in the output signal as will be understood. Preferably the gain calibrating means 90 are also electrically actuatable and programmable in a manner corresponding to the offset calibrating means. That is, the gain calibrating means preferably comprises digital-to-analog converter means as diagrammatically indicated at 90.1 and the memory unit is adapted to receive data from a sensor testing apparatus (not shown) and to furnish that data to a conventional gain adjusting means such as the potentiometer 90.2 via the unit output terminal 82.7, thereby to provide the sensor output with selected gain.

In accordance with the invention, the sensor calibrating means further comprises electrically actuatable means 94 for adjusting the sensor output signal to compensate for changes in gain in the output signal which are due to change in sensor temperature. Preferably the temperature-compensating gain calibrating means 94 is programmed after temperature characteristics of the individual sensors have been determined on test apparatus to permit precise temperature-compensation in gain in the output signal.

In a preferred embodiment, a thermistor or other temperature-sensing means is disposed in one of two parallel circuit paths in the sensor circuit such as one of the two parallel amplifiers 56, 58 in the second amplification stage 38. Preferably a corresponding temperature-independent reference resistor is also incorporated in the sensor circuit. Preferably, for example, the thermistor is arranged as the gain-control resistor 60 for one of the amplifiers 56 while the reference resistor comprises the coupling resistor 64. The thermistor is selected to have a positive or negative temperature coefficient of resistivity as preferred, and, if desired, is incorporated directly in the integrated circuit 20. Preferably, however, the thermistor 60 comprises a ceramic resistor of positive temperature coefficient of resistivity located exteriorly of the integrated circuit 20 and is connected into the circuit by pads 96, 98 while the reference resistor comprises a substantially temperature-independent metal resistor or the like connected in the circuit by pads 98, 100. The thermistor is selected to provide change in transmission of the signal provided by the temperature-responsive means 12 through the amplifier 56 in response to sensor temperature change, thereby to temperature-modify the second intermediate electrical signal furnished at point 70 in the sensor circuit as above-described.

The gain TC calibrating means 94 regulates signal transmission by the parallel amplifiers 56, 58 relative to each other to adjust the temperature-modified intermediate signal at 70 to compensate for changes in gain due to sensor temperature change. Preferably, for example, a potentiometer as diagrammatically indicated at 94.2 is connected across the outputs of the amplifiers 56, 58 and an adjustable contact of the potentiometer is connected to the negative terminal of the amplifier 72 via the coupling resistor 76. A digital-to-analog converter means diagrammatically indicated at 94.1 corresponds to the DAC means 78.1, 84.1 and 90.1 previously described and is arranged to selectively adjust the potentiometer 94.2 in response to data received from the memory output terminal 82.8 to adjust the output of the amplifiers relative to each other to adjust sensor gain. The memory unit is arranged to receive test data relating to temperature characteristics of the sensor output signal to compensate for changes in gain in the output signal which result from changes in sensor temperature.

In that arrangement, the sensor of the invention is adapted to utilize a low cost, high performance piezoresistive bridge circuit as previously described and also achieve not only readily automated, reliable and low cost calibration of offset and gain in the sensor output but also readily automated, precise and low cost compensation for changes in offset and gain which are due to temperature change. The sensor circuit is easily and economically implemented in linear CMOS technology to provide high performance in automotive applications and the like where severe temperature conditions are encountered. The offset and gain calibrating means including the TC offset and gain calibrating means are adapted to be incorporated in the integrated circuit 20 as is the sensor memory 82 if desired, thereby to be very compactly accommodated in a device such as accelerometer sensor which is sensitive to size and mass considerations. The structure of the invention is also adapted to be used in various types of sensors. The sensor bridge elements 22 are adapted to comprise piezoresistive means, magnetoresitive means or other conventional impedance means of various sorts so that the structure of the invention has wide application.

It should be understood that although particular embodiments of the invention have been described by way of illustrating the invention, the invention includes all modifications and equivalents of the disclosed embodiments falling within the scope of the appended claims.

I claim:

1. A sensor comprising condition-responsive means including a bridge circuit for providing an initial electrical signal in response to occurrence of a condition, integrated circuit means responsive to the initial electrical signal to provide an output signal corresponding to the condition, and means for calibrating the output signal including temperature responsive means responsive to the initial electrical signal and temperature of the sensor to provide a temperature modified intermediate signal and means which are electrically actuable, said temperature responsive means including two parallel circuit paths receiving the initial electrical signal, a temperature-sensing means disposed in one of said circuit paths, and digital-to-analog converter means incorporated in the integrated circuit electrically actuable to regulate signal transmission by the parallel circuit paths relative to each other to adjust the temperature-modified intermediate signal to adjust the gain in the output signal to compensate for the change in gain in the output signal due to change in temperature of the sensor.

2. A sensor according to claim 1 having EEPROM means programmed to regulate the digital-to-analog converter means in accordance with tested temperature characteristics of the sensor.

3. A sensor according to claim 2 wherein the parallel circuit paths comprise respective operational amplifier means in the integrated circuit, and the temperature-responsive means comprise a thermistor located exteriorly of the integrated circuit and connected in said one circuit path.

4. A sensor according to claim 2 wherein the parallel circuit paths comprise respective operational amplifiers in the integrated circuit, and the temperature-sensing means comprises a thermistor incorporated in the integrated circuit and connected in said one circuit path.

5. A sensor comprising condition responsive means including a bridge circuit for providing an initial electrical signal in response to occurrence of a condition, integrated circuit means responsive to the initial electrical signal to provide an output signal corresponding to the condition, and means for calibrating the output signal including temperature compensating means responsive to the initial electrical signal and temperature of the sensor to provide a temperature-modified intermediate signal and means which are electrically actuable, said temperature compensating means comprising two parallel circuit paths between a power source and ground, a temperature-sensing means disposed in one of said circuit paths, and digital-to-analog converter means incorporated in the integrated circuit electrically actuable to regulate signal transmission by the parallel circuit paths relative to each other to adjust the temperature-modified intermediate signal to adjust the offset in the output signal to compensate for change in offset in the output signal due to change in temperature of the sensor.

6. A sensor according to claim 5 having EEPROM means programmed to regulate the digital-to-analog converter means in accordance with tested temperature characteristics of the sensor.

7. A sensor according to claim 6 wherein the parallel circuit paths comprise respective legs of an additional bridge circuit incorporated in the integrated circuit, and the temperature-sensing means comprises a thermistor located exteriorly of the integrated circuit connected in said one circuit path.

8. A sensor according to claim 6 wherein the parallel circuit paths comprise respective legs of an additional bridge circuit incorporated in the integrated circuit, and the temperature-sensing means comprises a thermistor incorporated in the integrated circuit and connected in said one circuit path.

9. An acceleration sensor comprising a plurality of piezoresistive elements arranged in a bridge circuit in an accelerometer to provide an initial electrical signal in response to occurrence of an acceleration force, integrated circuit means responsive to the initial electrical signal to provide an amplified output signal corresponding to the acceleration force, and means for calibrating the output signal relative to the acceleration force, the calibration means including temperature responsive means responsive to the initial electrical signal and temperature of the sensor to provide a temperature-modified intermediate signal and means which are electrically actuable, said temperature-responsive means including two parallel circuit paths receiving input from the initial electrical signal, temperature-sensing means disposed in one of said circuit paths, and digital-to-analog converter means electrically actuable to regulate signal transmission by the parallel circuit paths relative to each other to adjust the temperature-modified intermediate signal to adjust the gain in the output signal to compensate for change in gain in the output signal due to change in temperature of the sensor, and including two additional parallel circuit paths between a power source and ground, additional temperature-sensing means disposed in at least one of said additional circuit paths, and digital-to-analog converter means electrically actuable to regulate signal transmission by the additional circuit paths relative to each other to adjust the temperature-modified intermediate signal to adjust the offset in the output signal to compensate in change in offset in the output signal due to change in temperature of the sensor.

* * * * *